US012051438B1

(12) United States Patent
Karimli et al.

(10) Patent No.: US 12,051,438 B1
(45) Date of Patent: Jul. 30, 2024

(54) USING MACHINE LEARNING TO LOCATE MOBILE DEVICE

(71) Applicant: T-Mobile USA, Inc., Bellevue, WA (US)

(72) Inventors: Yasmin Karimli, Kirkland, WA (US); Ryan Cyrus Khamneian, Kirkland, WA (US); Jie Hui, Mercer Island, WA (US); Antoine T. Tran, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 642 days.

(21) Appl. No.: 17/214,399

(22) Filed: Mar. 26, 2021

(51) Int. Cl.
| | |
|---|---|
| *G10L 25/51* | (2013.01) |
| *G06N 7/01* | (2023.01) |
| *G06N 20/00* | (2019.01) |
| *G10L 15/14* | (2006.01) |
| *H04M 3/22* | (2006.01) |
| *H04W 4/029* | (2018.01) |

(52) U.S. Cl.
CPC ............... *G10L 25/51* (2013.01); *G06N 7/01* (2023.01); *G06N 20/00* (2019.01); *G10L 15/14* (2013.01); *H04M 3/2218* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 2012/0117112 A1* | 5/2012 | Johnston | G01C 21/3608 707/E17.078 |
| 2019/0147260 A1* | 5/2019 | May | B60W 50/14 382/103 |
| 2020/0066256 A1* | 2/2020 | Mossoba | G10L 25/51 |

* cited by examiner

*Primary Examiner* — Antim G Shah
(74) *Attorney, Agent, or Firm* — Lee & Hayes, P.C.

(57) ABSTRACT

Described herein are techniques, devices, and systems for training a machine learning model(s) and/or artificial intelligence algorithm(s) to determine where a mobile device (and, hence, a user of the mobile device) is located based on audio data associated with the mobile device and/or contextual data associated with the mobile device. The machine learning techniques may be used to determine contextual information about users, such as determining that a particular location is likely to be a user's home, office, or the like, based on movement patterns exhibited in the data associated with a user's mobile device. Once trained, the machine learning model(s) is usable to classify a mobile device as having been located at one of multiple candidate locations, such as indoors or outdoors, at a particular time. The described techniques can improve the accuracy of determining a mobile device's location, among other technical benefits.

17 Claims, 7 Drawing Sheets

US 12,051,438 B1

USING MACHINE LEARNING TO LOCATE MOBILE DEVICE

BACKGROUND

Despite advancements in wireless network technology, wireless customers may still experience suboptimal coverage or quality of service (QoS) in certain locations. For example, it is not uncommon for a user's call to be dropped, or to at least degrade in quality, when the user moves from outdoors to indoors (e.g., into a building, a subway station, a parking garage, a tunnel, an elevator, etc.). Even with the availability of low-band spectrum (e.g., less than 1 gigahertz (GHz)), wireless customers may still experience poor QoS or a complete lack of coverage while indoors. Although installing in-building base stations can improve indoor coverage and QoS for wireless customers, it would be too costly to "blindly" install base stations in every single building of every single city without concern as to whether the installed equipment is actually going to be used by wireless customers.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
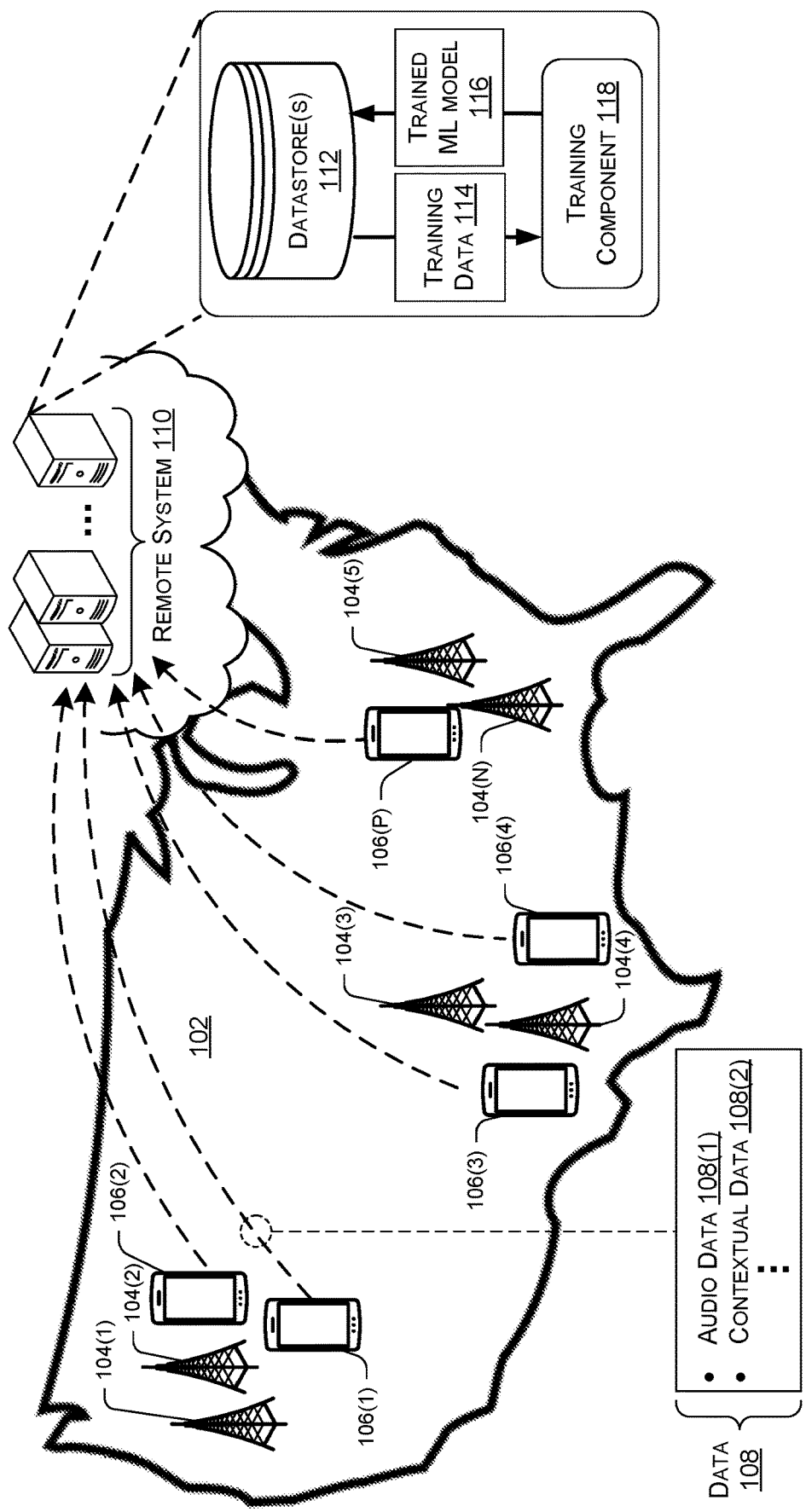
FIG. 1 is an example diagram illustrating a technique for training a machine learning model(s) based on data collected from mobile devices, in accordance with various embodiments.

While existing telecommunications networks provide suitable coverage and QoS to wireless customers in many outdoor settings, further technical improvements may enhance, among other things, coverage and QoS indoors. Described herein are, among other things, techniques, devices, and systems for training a machine learning model(s) and/or artificial intelligence algorithm(s) to determine where a mobile device (and, hence, a user of the mobile device) is located based on audio data associated with the mobile device and/or contextual data associated with the mobile device. In one example, using machine learning and/or artificial intelligence techniques to determine locations of mobile devices allows a wireless carrier to improve indoor coverage and/or indoor QoS associated with its telecommunications network. For instance, a wireless carrier can determine indoor locations where wireless customers are using their mobile devices, and may selectively install base stations at those determined indoor locations in a cost-efficient manner, as compared to a haphazard approach to installing in-building wireless infrastructure. The techniques and systems disclosed herein can also be utilized in various real-time algorithms to locate a mobile device. For example, a machine-learned location of a mobile device can be used in an emergency scenario to quickly find a person in distress, even if the mobile device is located indoors where it has lost a Global Positioning System (GPS) signal. The disclosed techniques may be implemented, at least in part, by a computing system of a wireless carrier (or "operator") that provides its users (sometimes called "subscribers," "customers," "wireless subscribers," or "wireless customers") with access to a variety of types of services over a telecommunications network.

A client application installed on mobile devices of wireless customers may assist the carrier's computing system in the collection of data for use with the disclosed machine learning techniques. This client application may be configured to collect various types of data as the mobile devices are being carried and/or used by wireless customers, such as to conduct communication sessions (e.g., phone calls) over the telecommunications network. For example, whenever a subscriber accesses services of a wireless carrier, audio data (e.g., audio data representing user speech and/or background noise) associated with the mobile device and/or contextual data associated with the mobile device may be collected by the client application, and the collected data may be sent to a remote computing system associated with the wireless carrier. This data (collected from many subscribers) can be maintained by the wireless carrier's system in association with subscriber accounts and/or mobile devices of the subscribers. Over time, one can appreciate that a large collection of historical data tied to subscribers and/or their mobile devices may be available to the wireless carrier's system. The wireless carrier's system can then train one or more machine learning models using a portion of the historical data as training data. For instance, a portion of the historical data can be represented by a set of features and labeled to indicate where mobile devices were located (e.g., indoors or outdoors, or inside buildings, subways, parking garages, etc.) at a time when the data was generated and/or collected by the client application. As an illustrative example, the machine learning model(s) may be trained using audio data samples representing voices of subscribers in different locations and circumstances so that the model(s) learns how to classify the input audio data as one of multiple class labels indicative of a location of the mobile device (and, hence, the user), such as by classifying the input audio data as "indoors" or "outdoors." Additionally, or alternatively, the machine learning model(s) may be trained using contextual data (e.g., lifestyle data, which may include, without limitation, call history data, application usage data, battery charging data, device connection data, settings data, sensor data, etc.). Furthermore, the machine learning techniques may be used to determine contextual information about users, such as determining that a particular location is likely to be a user's home, office, or the like, based on movement patterns, among other things, exhibited in the data associated with a user's mobile device. For instance, the machine learning model may learn, from data indicative of movement patterns of a user's mobile device, that a particular building is a user's place of residence because the user enters the same building at 6:00 PM most nights, and doesn't leave that building until 7:00 AM the next morning.

A machine learning model(s) trained on this data may receive audio data and/or contextual data associated with a mobile device as input, and may output a location classification or a score relating to a probability of the mobile device being located at a location of multiple candidate locations (e.g., indoors or outdoors). In an illustrative example, this model output may be used in a post-processing algorithm for network optimization, such as for recommending where to selectively deploy base stations (e.g., small cells) for indoor (e.g., in-building) solutions to improve network coverage and/or QoS indoors (e.g., inside a building(s)). Additionally, or alternatively, the model output may be used in various real-time algorithms, such as to enhance regulatory emergency (e.g., e911) calling by using a machine-learned location of a mobile device to find a person in distress as quickly as possible.

An example computer-implemented process may include providing, as input to a trained machine learning model, audio data associated with a mobile device, the audio data representing sound in an environment of the mobile device, and generating, as output from the trained machine learning model, a location classification or a score relating to a probability of the mobile device having been located at a location of multiple candidate locations at a time when the audio data was generated. The process may further include associating the mobile device with the location based at least in part on the location classification or score, and storing device-to-location association data in the memory based at least in part on the associating the mobile device with the location. Also disclosed herein are systems comprising one or more processors and one or more memories, as well as non-transitory computer-readable media storing computer-executable instructions that, when executed, by one or more processors perform various acts and/or processes disclosed herein.

The disclosed techniques, devices, and systems provide various technical benefits and practical applications. For example, the techniques, devices, and systems described herein can improve the accuracy of determining a mobile device's location. For instance, the location associated with the mobile device may be determined using machine learning, notwithstanding an unavailability of a GPS location (e.g., when the mobile device is located indoors and has lost a GPS signal). Additionally or alternatively, a machine-learned location of a mobile device can be used to augment a GPS-determined location, thereby improving location accuracy when a GPS location is relatively inaccurate (e.g., not accurate enough to pinpoint the location for e911 purposes). For instance, GPS data may resolve a location of a mobile device to a particular area due to the inherent inaccuracy of a GPS location. If a machine-learned location of a mobile device indicates that the mobile device is located indoors, a localization technique can determine that it is improbable for the mobile device to be located in an outdoor location within that particular area. Other embodiments described herein provide further technical benefits, such as providing a machine-learned location of a mobile device to a public safety answering point (PSAP) (e.g., for e911 calling), and/or using the machine-learned locations of mobile devices to recommend installing one or more base stations within, on, or near a structure (e.g., a building) where the mobile devices are often used (e.g., used above a threshold number of times a day, week, month, year, etc.), thereby improving network reliability, coverage, and/or QoS for wireless customers located indoors at the same location, and doing so in a cost-efficient manner. In some embodiments, the techniques, devices, and systems described herein may allow one or more devices to conserve resources with respect to processing resources, memory resources, networking resources, power resources, etc., in the various ways described herein. For example, a machine-learned location of a mobile device can be used by the mobile device to perform cell selection more efficiently (e.g., by conserve processing resources, battery power, networking resources, etc.) by avoiding scanning an entire spectrum of a wireless carrier, as described herein.

FIG. 1 is an example diagram illustrating a technique for training a machine learning model(s) based on data collected from mobile devices, in accordance with various embodiments. FIG. 1 illustrates a geographical area 102, and cells 104 that are distributed about the geographical area 102. The cells 104 are usable by mobile devices 106 to access a mobile network from various geographical locations throughout the geographical area 102. FIG. 1 shows a plurality of mobile devices 106(1), 106(2), 106(3), 106(4), . . . , 106(P) (collectively 106) distributed throughout the geographical area 102, which, in the example of FIG. 1, represents the contiguous United States of America, although it is to be appreciated that the mobile devices 106 and the cells 104 may be distributed throughout any suitable geographical area 102 anywhere in the world, at any scale or level of granularity when implementing the techniques and systems described herein.

An individual mobile device 106 may be implemented as any suitable computing device configured to communicate over a wireless network, including, without limitation, a mobile phone (e.g., a smart phone), a tablet computer, a laptop computer, a portable digital assistant (PDA), a wearable computer (e.g., electronic/smart glasses, a head-mounted display (HMD), a smart watch, fitness trackers, etc.), and/or any similar device. In accordance with various embodiments described herein, the terms "wireless communication device," "wireless device," "communication device," "mobile device," "computing device," "electronic device," "user device," and "user equipment (UE)" may be used interchangeably herein to describe any device (e.g., a mobile device 106) capable of performing the techniques and processes described herein. The mobile devices 106 may be capable of communicating wirelessly using any suitable wireless communications/data technology, protocol, or standard, such as Global System for Mobile Communications (GSM), Time Division Multiple Access (TDMA), Universal Mobile Telecommunications System (UNITS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE)—e.g., fourth Generation (4G), voice over New Radio (VoNR)—e.g., fifth Generation (5G), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

FIG. 1 illustrates a plurality of cells 104(1), 104(2), 104(3), 104(4), 104(5), . . . , 104(N) (collectively 104) distributed throughout the geographical area 102. As used herein, a "cell" 104 represents an access point (e.g., a cell tower, base station, etc.) and the coverage area created by the access point. The "coverage area", in this context, means the area or space around the access point in which a mobile device 106 can effectively access a mobile network or cellular network (e.g., a core network, such as an Internet Protocol Multimedia Subsystem (IMS) core) using radio frequency (RF) transmissions. The access point itself may include electronic communications equipment, antennae, and the like for communicating with mobile devices 106 using RF waves that are detectable within the coverage area of the cell 104. Each cell 104 may be associated with a particular radio access technology (RAT), or a combination of different RATs (e.g., 4G LTE RATs, and/or 5G RATs, etc.). In this manner, a given mobile device 106 may employ whichever type of RAT is associated with the cell 104 to which the given mobile device 106 is attached. Accordingly, any individual cell 104 may be enabled by one or more types of access points, such as a Base Transceiver Station (BTS) and/or a Node B that provides second generation (2G) and/or third generation (3G) service to attached mobile devices 106, and/or an E-UTRAN Node B (eNodeB or eNB) that provides 4G LTE service to attached mobile devices 106, and/or a Next Generation Node B (gNB) that provides 5G service to attached mobile devices 106, and/or any future type of node associated with any future IP-based network technology or evolution of an existing IP-based network technology. When a mobile device 106 is attached to a cell 104 to access a mobile/cellular network (e.g., to establish a voice-based communication session, a data-based communication session, etc.), the cell 104 providing the mobile device 106 with the access to the mobile/cellular network at the given moment is referred to as the "serving cell" 104. In accordance with various embodiments described herein, the terms "cell site," "cell tower," "base station," "gNB," "eNodeB," and "eNB," and may be used interchangeably herein to describe any access point capable of acting as a serving cell 104 and communicating wirelessly using any suitable wireless communications/data technology, protocol, or standard, such as GSM, TDMA, UMTS, EVDO, LTE, LTE+, GAN, UMA, CDMA, OFDM, GPRS, EDGE, AMPS, HSPA, HSPA+, VoIP, VoLTE—e.g., 4G, VoNR—e.g., 5G, IEEE 802.1x protocols, WiMAX, Wi-Fi, DOCSIS, DSL, and/or any future IP-based network technology or evolution of an existing IP-based network technology.

In general, users of the mobile devices 106 shown in FIG. 1 may have subscribed to services that a wireless carrier (or cellular network operator) provides to its customers. Such a wireless carrier may utilize the cellular network (sometimes referred to herein as a "telecommunications network" or "mobile network") for delivering IP multimedia to the mobile devices 106 of its customers. For example, a service provider may offer multimedia telephony services that allow a subscriber to call or message other users via the cellular network using his/her mobile device 106. A subscriber can also utilize an associated mobile device 106 to receive, provide, or otherwise interact with various different services by accessing a core network via various network nodes. In this manner, a wireless carrier may offer any type of service (s) (e.g., IMS-based services), such as telephony services (or voice calling), emergency services (e.g., E911), gaming services, instant messaging services, presence services, audio/video streaming services, video conferencing services, augmented reality (AR) and/or virtual reality (VR) services, social networking and sharing services, location-based services, push-to-talk services, WiFi calling services, real time text (RTT) services, RTT calling services and/or video calling services, and so on. In order to access one or more of these services, a mobile device 106 is configured to complete a registration procedure and thereafter request establishment of a communication session via a serving cell 104.

As the mobile devices 106 are carried by users between various geolocations, and as the mobile devices 106 are used to access the services described herein (e.g., to conduct communication sessions, such as phone calls) over a mobile network, client applications installed on the mobile devices 106 may be triggered at instances to collect data 108, temporarily store the collected data 108 in device storage, and send the data 108 to a remote system 110. It is to be appreciated that an "opt-in" model is employed where customers opt-in and agree to provide data relating to the usage of their mobile devices before it is collected and sent to the remote system 110. Furthermore, it is to be appreciated that the data 108 may be collected in an anonymous fashion by redacting or deleting personal information or otherwise sensitive information. The mobile devices 106 may communicate with or send collected data 108 to the remote system 110 (sometimes referred to herein as "computing system 110," or "remote computing system 110") at any suitable time and/or over any suitable computer network including, without limitation, the Internet, other types of data and/or voice networks, a wired infrastructure (e.g., coaxial cable, fiber optic cable, etc.), a wireless infrastructure (e.g., RF, cellular, satellite, etc.), and/or other connection technologies. In some embodiments, collected data 108 may be sent to the remote system 110 on a pre-set schedule or during a predetermined time period (e.g. on a daily basis) and/or whenever a data connection becoming available. In order to conserve resources (e.g., power resources, such as battery of the mobile device 106, network bandwidth, such as during a high-traffic period, etc.), data 108 can be scheduled to be sent to the remote system 110 at a relatively infrequent basis (e.g., daily, weekly, etc.). In other examples, the data 108 is sent in real-time as it is generated or otherwise collected at the mobile device 106, assuming the mobile device 106 is connected to a network at the time the data 108 is generated or otherwise collected. The remote system 110 may, in some instances be part of a network-accessible computing platform that is maintained and accessible via a computer network, and the remote system 110 may represent a plurality of data centers distributed over a geographical area, such as the geographical area 102. Network-accessible computing platforms such as this may be referred to using terms such as "on-demand computing", "software as a service (SaaS)", "platform computing", "network-accessible platform", "cloud services", "data centers", and so forth.

It is to be appreciated that various events may trigger the client application running on a mobile device 106 to collect data 108. For example, a client application running on the mobile device 106(1) may collect data 108 at the start of a communication session (e.g., during setup). Additionally, or alternatively, the client application may collect data 108 at the end of a communication (e.g., during teardown). Additionally, or alternatively, the client application may collect data 108 when the mobile device 106 is idle and/or used while not presently engaged in setting up, conducting, or terminating a communication session (e.g., a phone call).

The client application running on a mobile device 106 may temporarily store collected data 108 in local memory of the mobile device 106 until a later point in time when one or more of the collected data 108 are sent to the remote system 110. For example, data 108 collected during a period of time (e.g. one day) can be sent to the remote system 110 in batch at a scheduled time and/or when a data connection becomes available to the mobile device 106.

FIG. 1 illustrates that the data 108 may include, without limitation, audio data 108(1) and/or contextual data 108(2), among other possible types of data. The audio data 108(1) may represent sound in an environment of the mobile device 106(1) at a time when the audio data 108(1) was generated. For example, the audio data 108(1) may represent user speech (e.g., a voice of a user talking in the vicinity of the mobile device 106). In some examples, the audio data 108(1) may be generated during an ongoing communication session (e.g., a call, such as a VoLTE call, a VoNR call, etc.). In this example, the audio data 108(1) may represent the user's voice as the user talks "into" the mobile device 106(1) with the intention of being heard by another party, and/or the audio data 108(1) may represent background noise in the environment regardless of whether the user is talking or not. In other examples, the user may invoke a digital assistant using his/her voice, and the audio data 108(1) may represent the user's voice in the context of speaking to the digital assistant. In other examples, the client application of the mobile device 106(1) may generate audio data 108(1) representing sound in the environment of the mobile device 106 outside of the context of a communication session, and this sound may or may not include a human voice. In general, the audio data 108(1) may be generated using a microphone of the mobile device 106(1), which is configured to capture sound in the vicinity of the mobile device 106 and to convert the sound into digital audio data 108(1). Such a microphone(s) may represent a microphone array, such as a beamforming array. The conversion of the sound into digital audio data 108(1) may include using analogue-to-digital (A/D) conversion. Furthermore, the audio data 108(1) may include analog audio information, digital audio information or a combination thereof. In some examples, the audio data 108(1) may include an audio impulse response obtained from a built-in audio echo canceller (AEC) of the mobile device 106. During two-way audio communications, an AEC is used to remove loudspeaker audio from the microphone signal of a device. The AEC may be implemented using a digital adaptive finite impulse response (FIR) filter that is dependent on the audio impulse response of the device's environment. Rather than measuring the impulse response directly, however, an AEC has a learning algorithm that learns the impulse response based on the loudspeaker signal, the microphone input signal, and the filtered microphone signal. The learning algorithm operates continuously to update the impulse response in response to changes in the environment. When using a digital adaptive FIR as part of an AEC, the audio impulse response is represented by a sequence of coefficients, which may also be referred to as filter weights. In a described embodiment, such a sequence of coefficients may represent the acoustic impulse response of the space within which the mobile device 106 is located (i.e., the room impulse response). As such, the sequence of coefficients may be useful in machine learning techniques to determine whether the mobile device 106 is indoors or outdoors because indoor spaces typically exhibit different impulse responses than outdoor spaces. In some examples, the audio data 108(1) may be generated as one or more audio samples.

Meanwhile, the contextual data 108(2) may reflect lifestyle choices, habits, and/or routines of a user of the mobile device 106(1) in the context of using the mobile device 106(1). For example, the contextual data 108(2) may include, without limitation, a time series of GPS locations that may be indicative of travel routes to various destinations (e.g., work, school, etc.) and/or living habits (e.g., locations where the user sleeps at night, wake up patterns, etc.), call history data relating to one or more phone calls made using the mobile device 106 (e.g., a time of the call, a duration of the call, etc.), application usage data relating to one or more mobile applications (e.g., video streaming applications, such as Netflix®, music streaming applications, such as Spotify®, etc.) used by the mobile device 106, battery charging data relating to charging of a battery of the mobile device 106 (e.g., a time when the battery started and/or ended charging, a duration of the battery charging, a location where the battery was charged, etc.), device connection data relating to one or more devices to which the mobile device 106 connected via a wired connection or a wireless connection, settings data relating to one or more settings (e.g., device settings) associated with the mobile device 106 (e.g., display brightness, audio volume, etc.), sensor data generated by one or more sensors of the mobile device 106(1) (e.g., an ambient light sensor(s), an image sensor(s), an inertial measurement unit (IMU) and/or a gyroscope, accelerometer, or the like, and so on). These are merely examples of contextual data 108(2), and the present disclosure is not limited to these types of contextual data 108(2).

FIG. 1 shows that the remote system 110 may store the data 108 it collects from the mobile device 106 in a datastore 112, which may represent a data repository maintained by, and accessible to, the remote computing system 110. The data 108 may be organized within the datastore 112 in any suitable manner to associate subscriber accounts and/or mobile devices 106 with relevant portions of the data 108 relating to those subscriber accounts. Over time, given a large community of subscribers that frequently utilize mobile devices 106 to access services of a wireless carrier, sometimes for long periods of time during a given session, a large amount of data 108 can be collected and maintained in the datastore 112.

The remote system 110 may use machine learning and/or artificial intelligence to process the data 108 and to learn how to locate mobile devices 106 based on the data 108. Machine learning generally involves processing a set of examples (called "training data 114") in order to train a machine learning model(s). A machine learning model(s) 116, once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model can be trained to infer a probability, or a set of probabilities, for a classification task based on unknown data received as input. In the context of the present disclosure, the unknown input may include audio data 108(1) and/or contextual data 108(2), and the trained machine learning model(s) 116 may be tasked with outputting a location classification or a score that indicates, or otherwise relates to, a probability of a mobile device 106 being classified in one of multiple classes that indicate a location of the mobile device 106. For instance, the score output from the trained machine learning model(s) 116 may relate to a probability of the mobile device 106 having been located at a location of multiple candidate locations at a time when the input data 108 was generated. In some embodiments, the score output from the trained machine learning model(s) 116 is a variable that is normalized in the range of [0,1]. In some implementations, the trained machine learning model(s) 116 may output a set of probabilities (e.g., two probabilities), or scores relating thereto, where one probability (or score) relates to the probability of the mobile device 106 having been located at a first location (e.g., indoors), and the other probability (or score) relates to the probability of the mobile device 106 having been located at a second location (e.g., outdoors). The score that is output by the trained machine learning model(s) 116 can relate to either of these probabilities to indicate a level of confidence that a mobile device 106 is in one of multiple locations (e.g., indoors or outdoors). The "indoors or outdoors" classification is an example of a binary classification task. In some examples, the output from the trained machine learning model(s) 116 may be more granular than a binary (e.g., indoors or outdoors) classification, such as by classifying the mobile device 106 as having been located in a building, in a subway, and/or on a particular floor of a building (e.g., three-dimensional (3D) location classification). In some examples, the machine learning techniques may be used to determine contextual information about users, such as determining that a particular location is likely to be a user's home, office, or the like, based on movement patterns, among other things, exhibited in the data associated with a user's mobile device. For instance, data (e.g., a time series of GPS locations and/or cell identifiers of cells 104 or other access points to which the mobile device 106 was attached) may be indicative of movement patterns of a user's mobile device 106. In an illustrative example, such data may indicate that a user enters the same building at 6:00 PM most nights, and doesn't leave that building until 7:00 AM the next morning. During a training process, the machine learning model(s) may learn, from this data, that a particular building is likely a user's place of residence, as just one example piece of contextual information.

The trained machine learning model(s) 116 may represent a single model or an ensemble of base-level machine learning models, and may be implemented as any type of machine learning model. For example, suitable machine learning models 116 for use by the techniques and systems described herein include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models 116 whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The remote system 110 may include a training component 118 that is configured to train machine learning models using training data 114, which may represent a sampled subset of the data 108 collected and stored in the datastore 112. In general, training data 114 for machine learning can include two components: features and labels. However, the training data 114 used to train the machine learning model(s) 116 may be unlabeled, in some embodiments. Accordingly, the machine learning model(s) 116 may be trainable using any suitable learning technique, such as supervised learning, unsupervised learning, semi-supervised learning, reinforcement learning, and so on. The features included in the training data 114 can be represented by a set of features, such as an n-dimensional feature vector of quantifiable information about an attribute of the training data 114. Example features included in the training data 114 may include any suitable quantifiable characteristic or attribute of the audio data 108(1), such as, without limitation, frequencies, intensities, decibel levels, signal-to-noise ratios (SNRs), signal-to-interference-plus-noise ratios (SINRs), Fourier transforms, tonal qualities of the sound, a noise level of any background noise, a volume or intonation of a human voice, sound reflections, sound recognition results (e.g., a baby crying, glass breaking, a car horn honking, etc.), speech recognition results (e.g., recognized user speech), etc. In some examples, data may be derived from audio information through mathematical computation/analysis such as Fourier transform(s), impulse response(s), etc., and the machine learning training may utilize features from this derived data. For example, a frequency component of audio may be obtained from a Fourier transform(s) of the audio data 108(1), and/or an impulse response signature of a returned audio echo from the environment when the user is in a hands free mode of using the mobile device 106 may be obtained from the audio data 108(1). Accordingly, features included in the training data 114 may include any suitable quantifiable characteristic or attribute of the aforementioned derived data, such as a sequence of coefficients (or filter weights) that are representative of an acoustic impulse response. Other example features included in the training data 114 may include any suitable quantifiable characteristic or attribute of the contextual data 108(2), such as, without limitation, distance traveled on a travel route, times (e.g., time of day, day of week, etc.) and/or durations associated with travel routes, movement patterns, sleeping patterns, wake-up patterns, phone calls or other types of communication sessions, mobile application usage (e.g., video streaming, music streaming, etc.), battery charging, external device connections, as well as quantifiable settings data (e.g., display brightness, audio volume, etc.) and/or sensor data (e.g., acceleration values, device orientation, ambient light levels, etc.) As part of the training process, weights may be set for machine learning. These weights may apply to a set of features included in the training data 114. In some embodiments, the weights that are set during the training process may apply to parameters that are internal to the machine learning model(s) (e.g., weights for neurons in a hidden-layer of a neural network). These internal parameters of the machine learning model(s) may or may not map one-to-one with individual input features of the set of features. The weights can indicate the influence that any given feature or parameter has on the probability that is output by the trained machine learning model 116.

Figure 2:
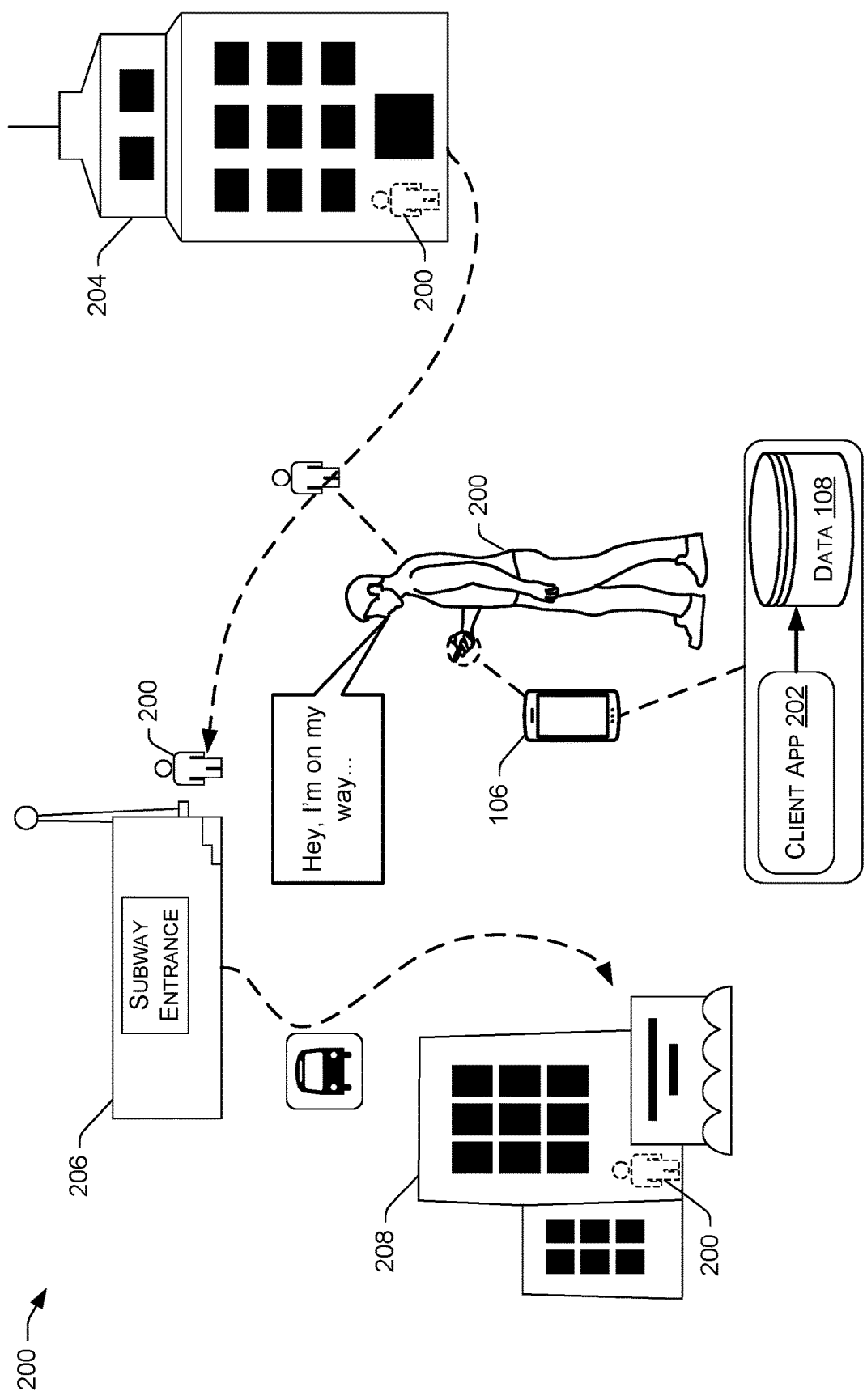
FIG. 2 illustrates an example scenario of a user using a mobile device over the course of a day, as well as techniques for collecting data associated with the use of the mobile device, the data being usable for the machine learning techniques described herein.

FIG. 2 illustrates an example scenario of a user 200 using a mobile device 106, as well as techniques for collecting data 108 associated with the use of the mobile device 106, the data 108 being usable for machine learning, in accordance with various embodiments. The user 200 in FIG. 2 may possess a mobile device 106 with a client application 202 installed thereon, the client application 202 configured to generate and/or collect various types of data 108 as the mobile device 106 is being carried and/or used, such as to conduct communication sessions (e.g., phone calls) over a telecommunications network. As described herein, the data 108 may be sent to the remote system 110 of a wireless carrier at any suitable time for purposes of training a machine learning model(s) and/or for purposes of providing the data 108 as real-time input to a trained machine learning model(s) 116. In the illustrative example of FIG. 2, the user 200 may reside in an apartment building 204. If the mobile device 106 loses a GPS signal when the mobile device 106 is inside the building 204, the client application 202 may collect data 108 (e.g., GPS data, cell identifier data, etc.) that is indicative of the user's 200 last-known location on a particular day before the GPS signal is lost, and/or the user's 200 first-known location on the following day when the GPS signal is regained. This data 108 may exhibit a sleeping pattern that can be used to infer that the user 200 sleeps (or otherwise spends the night) within the building 204 on a frequent basis. Accordingly, as part of the training process that is carried out to train a machine learning model(s), the model(s) may learn to identify particular locations as being associated with a user's 200 home, office, or the like. For instance, based on movement patterns, sleeping patterns, wakeup patterns, and the like exhibited in the data 108, a machine learning model(s) may be trained to associate particular locations with particular designators, such as by designating the building 204 as the user's 200 place of residence (e.g., "home"). The client application 202 may collect other data 108 (e.g., battery charging data) that is indicative of when, and how long, the user 200 charged a battery of the mobile device 106 while in the building 204. The client application 202 may collect other data 108 (e.g., application usage data) that is indicative of the user 200 having watched videos using a mobile video streaming application for a significant duration. The client application 202 may collect data 108 (e.g., display brightness setting adjustments) that indicate an automatic dimming of the display when the mobile device 106 enters the building 204, and/or data 108 (e.g., sensor data) that is indicative of the detection of artificial lighting within the building 204 (e.g., detected via an ambient light sensor of the mobile device 106, an image sensor of the mobile device 106, etc.).

The user 200 might wake up on a work day, exit the building 204, and walk to a subway station 206. During this walk, the client application 202 may collect data 108 (e.g., GPS data, cell identifier data, etc.) indicative of the user's 200 path (or travel route) to the subway station 206. The user 200 might call a co-worker to tell the co-worker "Hey, I'm on my way . . . " That is, the mobile device 106 may establish a communication session (e.g., a VoLTE call, a VoNR call, etc.), and during that session, the microphone(s) of the mobile device 106 may generate audio data 108(1), and the client application 202 may collect that audio data 108(1). If the session started in the lobby of the building 204, the background noise in the environment of the mobile device 106 might change as the user exits the building 204 (e.g., the background noise may get noisier from vehicle traffic, wind, birds chirping, etc.), and/or the volume and/or tone of the user's 200 voice might change (e.g., the user 200 might begin to talk louder outdoors to compensate for a noisier environment). Some or all of these audio characteristics may be exhibited in audio data 108(1) collected by the client application 202.

As the user 200 enters the subway station 206, a GPS signal of the mobile device 106 may be lost. The user 200 may hang up the call and plug headphones into the mobile device 106 and may access downloaded content (e.g., video content, audio content, etc.) to watch or listen to the content while on a subway train to an office building 208 where the user 200 works. The client application 202 may collect any of this contextual data 108(2) (e.g., device connection data regarding the headphones, application usage data regarding the content watched or listened to, etc.). While in the office building 208, the user 200 may charge the battery of the mobile device 106, make phone calls, and the like. During the day at the office building 208, the client application 202 may collect any of this data 108, as described herein, such as contextual data 108(2) (e.g., call history data, battery charging data, device connection data, etc.) and/or audio data 108(1) (e.g., the audio data 108(1) corresponding to a phone call made from the office building 208). When the user 200 leaves work and returns home on the subway train, the user 200 might make another phone call. As the user 200 enters the apartment building 204, the user 200 might begin to speak more quietly than the user 200 spoke while outdoors or in the subway station. Meanwhile, the lighting in the environment (as detected by the device's 106 light sensor(s)) may change, the display settings may change, the user 200 may open and use different mobile applications on the mobile device 106, etc. Accordingly, the client application 202 may assist with the collection of a rich set of data 108 that can be used for training a machine learning model(s), which may involve learning contextual information about users 102 (e.g., their places of residence, places of employment, places of friends or other contacts of the user 200, etc.), as described herein. In some examples, the client application 202 may assist with providing data 108 as real-time input to a trained machine learning model(s) 116 that has been trained to determine where the mobile device 106 is located (e.g., where the mobile device 106 was located when the data 108 was generated or collected), even in instances where the mobile device 106 is unable to obtain a GPS signal (e.g., while in the subway station 206).

Figure 3:
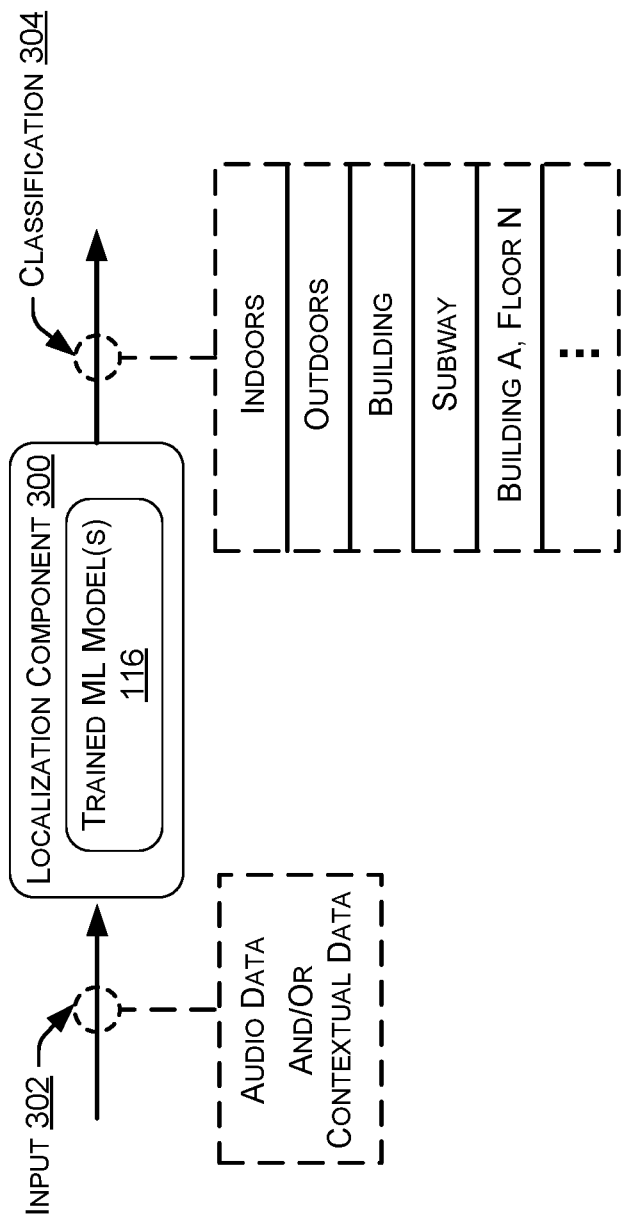
FIG. 3 illustrates a trained machine learning model(s) being used to determine a location classification associated with a mobile device, in accordance with various embodiments.

FIG. 3 illustrates a trained machine learning model(s) 116 being used to determine a location classification associated with a mobile device 106, in accordance with various embodiments. The trained machine learning model(s) 116 may reside in the cloud (e.g., at a remote location accessible to the remote system 110). For example, the remote system 110 may load the trained machine learning model(s) 116 from the data store 112 and use the model(s) 116 in a post-processing algorithm, or in a real-time algorithm, to classify a location of a mobile device 106. For example, a localization component 300 may represent a component of the remote system 110. In a post-processing algorithm, the localization component 300 may be configured to access data 108 from the data store 112 at any suitable time and provide the data 108 as input 302 to the trained machine learning model(s) 116. In a real-time algorithm, the localization component 300 may receive data 108 from a mobile device 106 (e.g., within a threshold amount of time since the data 108 was generated and/or collected by the mobile device 106), and the localization component 300 may provide the received data 108 as input 302 to the trained machine learning model(s) 116. In this manner, a location determination can be made in real-time, or it can be made at any suitable time after the data 108 is received by the remote system 110. In other examples, the localization component 300 may represent a component of the mobile device 106. In this scenario, a trained machine learning model(s) 116 may be sent (e.g., downloaded) to the mobile device 106, and thereafter utilized locally on the mobile device 106, with little-to-no assistance from the remote system 110 in terms of the machine learning model(s) 116 being used to locate the mobile device 106.

FIG. 3 further illustrates that the trained machine learning model(s) 116 may generate a classification 304 as output. As described above, the classification 304 may be in the form of a location classification or a score relating to a probability of the mobile device 106 being classified in one of multiple classes that indicate a location of the mobile device 106. For instance, the classification 304 (e.g., score) output from the trained machine learning model(s) 116 may relate to a probability of the mobile device 106 having been located at a location of multiple candidate locations at a time when the input data 108 was generated. In some examples, the classification 304 is a binary classification (e.g., indoors or outdoors; an indoor location or an outdoor location). That is, the classification 304 (e.g., score) may relate to a probability of the mobile device 106 having been located indoors and/or a probability of the mobile device 106 having been located outdoors when the input data 108 was generated. For example, audio data 108(1) provided as input 302 to the trained machine learning model(s) 116 may exhibit the sound of a voice that is slightly muffled, or it may exhibit a characteristic indicative of a voice that is affected by objects in the user's 200 environment (e.g., walls, furniture, material (e.g., wood, metal, glass, concrete, etc.)). In some cases, the audio data 108(1) provided as the input 302 may exhibit a human voice that is of poor audio quality, which may be indicative of the audio data 108(1) having been generated when the user 200 was inside of a building or a parking garage where the mobile device 106 had poor reception (e.g., degraded QoS) during a call.

In some examples, in addition to, or instead of, a binary classification, the classification 304 can be a more granular classification 304, such as "building," "subway," "parking garage," "home," "office," or the like. In other words, the trained machine learning model(s) 116 may be configured to determine a specific type of indoor location based on the data 108 provided as the input 302 to the model(s) 116. In some examples, the classification 304 may be a 3D location classification, such as by outputting a probability that a mobile device 106 is located on a particular floor (e.g., floor N) of a particular building (e.g., building A), such as the particular high-rise apartment building 204 depicted in FIG. 2.

The classification 304 that is output from the trained machine learning model 116 can be associated with the mobile device 106 and/or a subscriber account of a user 200 of the mobile device, and stored as device-to-location association data, such as in the datastore 112. The classification 304 and/or the stored device-to-location association data can be utilized in a wide variety of applications. One example application is for wireless infrastructure planning for a wireless carrier's network. This example application can utilize a post-processing machine learning technique, as described above. That is, knowing past locations of mobile devices 106, a wireless carrier can determine where its customers utilize their mobile devices 106, and, the wireless carrier can selectively install base stations (e.g., small cells) to expand coverage and/or improve QoS to wireless customers in a cost-effective manner. That is, if the trained machine learning model(s) 116 indicates that mobile devices 106 are often used by wireless customers in a particular building, such as the building 204 depicted in FIG. 2, the wireless carrier can install base station equipment in the building 204 to provide better QoS to customers when they are in that building 204. The machine learning technique of locating mobile devices 106, as described herein, allows the wireless carrier to selectively improve coverage and QoS for the wireless carrier's services at locations where customers need it the most. In other words, it allows for strategic, cost-effective wireless infrastructure planning and improvement. Notably, the machine learning techniques described herein may be utilized notwithstanding a lack of sufficient GPS data regarding mobile devices 106. That is, oftentimes mobile devices 106 lose a GPS signal when they are moved indoors (e.g., into an underground subway station 206, a subterranean parking garage, etc.). The disclosed techniques allow for accurately determining a location of a mobile device 106 notwithstanding this unavailability of GPS data while the mobile device 106 remains indoors.

Other example applications that may benefit from the classification 304 include real-time applications. One example real-time application is to improve emergency (e.g., e911) services. For example, emergency responders can respond to an emergency more quickly if the emergency responders know where a person in distress is located. Accordingly, if a mobile device 106 is used to call a public safety answering point (PSAP), real-time data 108 collected by the client application 202 of the mobile device 106 may be provided as input 302 to a trained machine learning model(s) 116 to assist in the determination of where a person in distress is located. Say, for example, a person is in distress in a subterranean parking garage and a mobile device 106 is used to dial an emergency short code (e.g., 911 in the United States) to report the emergency. The mobile device 106 may not have a GPS signal in the parking garage. To help locate the person in distress, the client application 202 of the mobile device 106 may be used to provide audio data 108(1) and/or contextual data 108(2) as input 302 to a trained machine learning model(s) 116, which may generate, as output, a location classification 304 that indicates the mobile device 106 is located indoors and/or in a parking garage. This information can be provided to a 911 operator at a PSAP to assist emergency responders in locating the person in distress, such as by narrowing down the search area for the person.

Another example real-time application is to reduce the time spent and conserve resources while connecting to a telecommunications network. For example, a mobile device 106 may be powered on from a powered-off state, or the mobile device 106 may have previously been connected to a telecommunications network and facilitating a communication session (e.g., a phone call) when the mobile device 106 lost connectivity (e.g., the call was dropped). In attempting to reconnect to the telecommunications network to establish/re-establish a communication session, the mobile device 106, instead of scanning the entire spectrum owned by the wireless carrier, may use the machine learning techniques described herein to identify a most-likely cell 104 based on the classification 304 output from the trained machine learning model(s) 116. For example, the mobile device 106 can cause data 108 to be provided as input 302 to the trained machine learning model(s) 116, and may utilize the classification 304 output therefrom to determine a particular frequency to try first when the mobile device 106 is attempting to reconnect to a telecommunications network. For example, if the mobile device 106 determines, from the output of the machine learning model(s) 116 that the mobile device 106 is likely located in a particular building known to be in Bellevue, Washington, the mobile device 106 can refrain from scanning an entire spectrum of a wireless carrier and instead try one or more predetermined frequencies to connect to a nearby cell 104 in Bellevue, Washington, thereby reducing the time to reconnect to the network.

Another example real-time application is to increase the efficiency of network paging. That is, a network node of a telecommunications network that is tasked with paging a mobile device 106 may conserve resources by directly paging the cells 104 most likely to be near the mobile device 106, instead of paging the entire network on a global scale. That is, the output of the trained machine learning model(s) 116 may be used to assist a network node in narrowing a large list of cells 104 down to a subset of cells 104 that are the most-likely candidate cells 104 to page the mobile device 104.

Another example real-time application is to provide location-based services to mobile devices 106. For example, a service provider may use the trained machine learning model(s) 116 to assist with locating a mobile device 106 and use the location classification 304 to provide relevant, targeted services (e.g., targeted advertisements, offers, etc.) that may be useful to a user 200 of the mobile device 106. Such location-based services may include, without limitation, delivery services, food services, retail services, and the like.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 4:
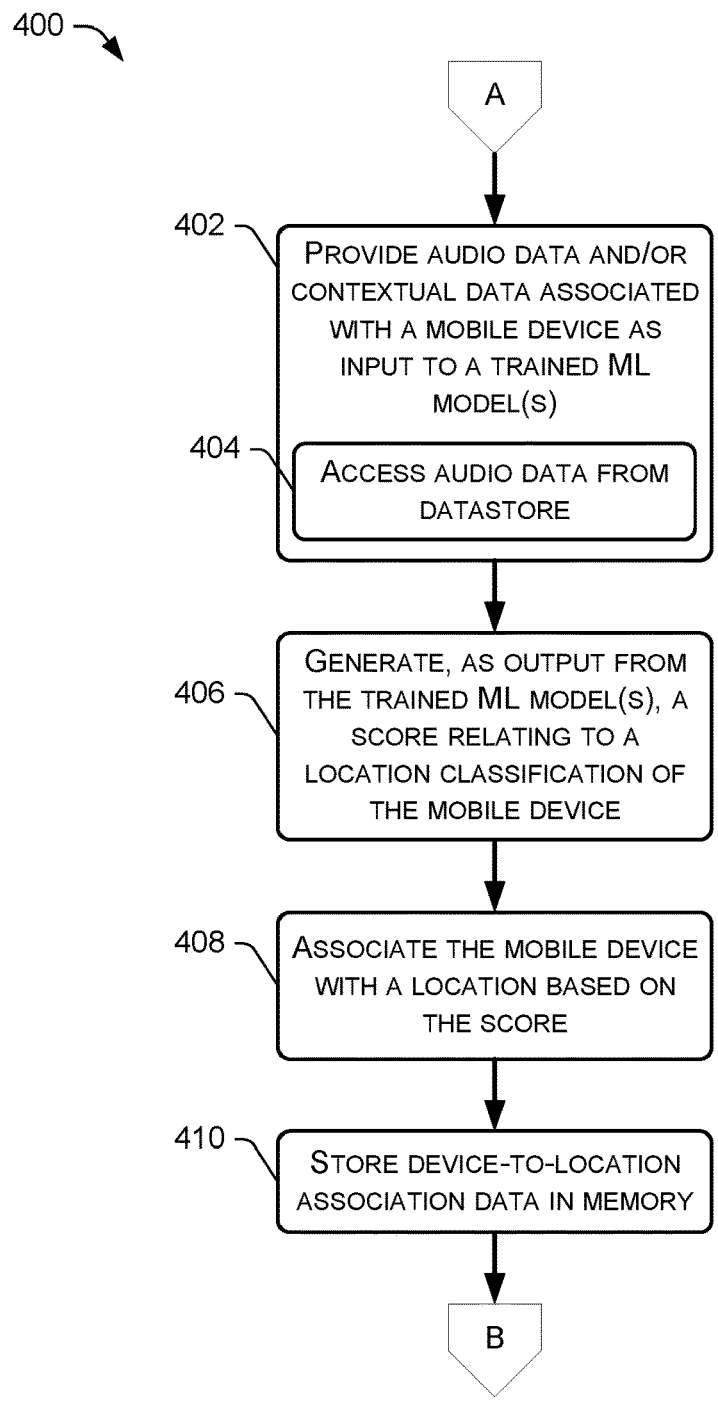
FIG. 4 illustrates a flowchart of an example process for using a trained machine learning model(s) to locate a mobile device.

FIG. 4 illustrates a flowchart of an example process 400 using a trained machine learning model(s) 116 to locate a mobile device 106. For discussion purposes, reference is made to the previous figure(s) in describing the process 400.

At 402, a computing system (e.g., the remote system 110, a mobile device 106, etc.) may provide, as input 302 to a trained machine learning model(s) 116, audio data 108(1) and/or contextual data 108(2) associated with a mobile device 106. If both types of data 108 (e.g., audio data 108(1) and contextual data 108(2)) are provided as input 302 to the trained machine learning model(s) 116, for example, the audio data 108(1) may be provided as input 302 to the trained machine learning model(s) 116, and the contextual data 108(2) may be provided as additional input 302 to the trained machine learning model(s) 116.

The audio data 108(1) may represent sound in an environment of the mobile device 106. In some examples, the audio data 108(1) represents user speech. In some examples, the audio data 108(1) is generated while the mobile device 106 is involved in a communication session (e.g., a VoLTE call, a VoNR call, etc.).

The contextual data 108(2) may include, without limitation, call history data relating to one or more phone calls made using the mobile device 106, application usage data relating to one or more mobile applications used by the mobile device 106, battery charging data relating to charging of a battery of the mobile device 106, device connection data relating to one or more devices (e.g., access points, cells 104, Bluetooth® devices, etc.) to which the mobile device 106 connected via a wired connection or a wireless connection, settings data (e.g., device settings data) relating to one or more settings associated with the mobile device 106, and/or sensor data generated by one or more sensors of the mobile device 106, as described herein.

At sub-block 404, the computing system may access the audio data 108(1) and/or the contextual data 108(2) from a datastore 112 prior to the providing of the audio data 108(1) and/or the contextual data 108(1) as the input 302 to the trained machine learning model(s) 116. For example, the remote system 110 may access the data 108 from the data store 112 and provide the data 108 as input 302 to the trained machine learning model(s) 116 in a post-processing algorithm, as described herein.

At 406, the computing system may generate, as output from the trained machine learning model(s) 116, a location classification 304 associated with the mobile device 106 or a score relating to a probability of the mobile device 106 having been located at a location of multiple candidate locations at a time when the audio data 108(1) and/or contextual data 108(2) was generated. The multiple candidate locations may include two locations, such as an indoor location and an outdoor location. In some examples, the multiple candidate locations may include more than two locations, such as a building, a subway, a parking garage, a home, an office, an outdoor location, etc. Accordingly, if the location of the mobile device 106 is classified as an indoor location, the output from the trained machine learning model(s) 116 may specify the indoor location as at least one of a building, a subway; or a parking garage, a home, an office, for example. These example location classes are merely examples.

At 408, the computing system may associate the mobile device 106 with the location (e.g., the indoor location) based at least in part on the location classification 304 or the score generated as output from the trained machine learning model(s) 116. At 410, the computing system may store device-to-location association data in memory (e.g., the datastore 112) based at least in part on the associating of the mobile device 106 with the location (e.g., the indoor location). In other words, the device-to-location association data may indicate that the mobile device 106 is located indoors or outdoors, in a building, a subway, a parking garage, a home, an office, or the like.

Figure 5:
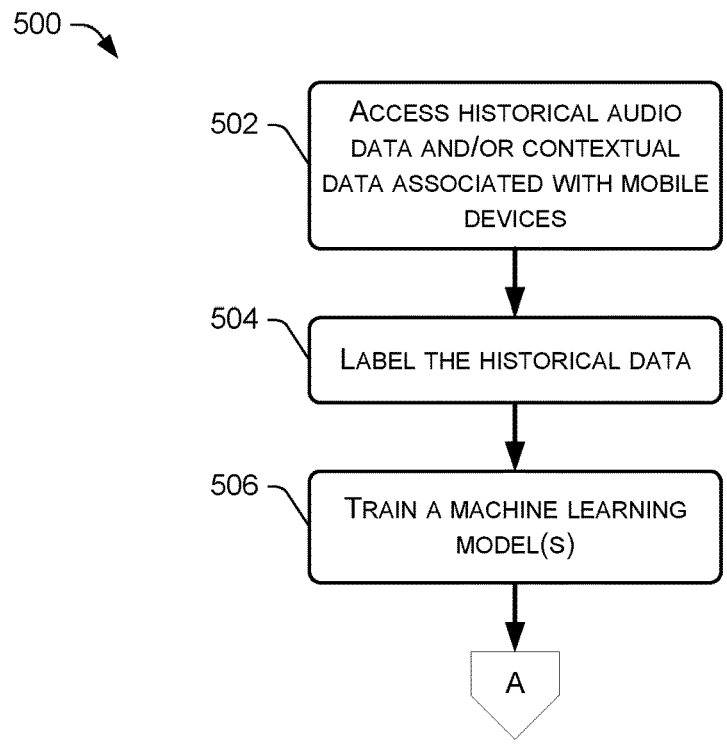
FIG. 5 illustrates a flowchart of an example process for training a machine learning model(s).

FIG. 5 illustrates a flowchart of an example process 500 for training a machine learning model(s). For discussion purposes, reference is made to the previous figures in describing the process 500.

At 502, a computing system (e.g., the remote system 110, a mobile device 106, etc.) may access historical data 108 (e.g., audio data 108(1) and/or contextual data 108(2)) associated with mobile devices 106. For example, the remote computing system 110 may access historical data 108 from the datastore 112, such as data 108 associated with a sampled set of subscriber accounts and/or mobile devices 106.

At 504, the computing system may label the historical data 108 (e.g., audio data 108(1) and/or contextual data 108(2)) with a label that indicates whether the mobile devices 106 associated with the historical data 108 (e.g., audio data 108(1) and/or contextual data 108(2)) were located indoors (or outdoors) at a time when the data 108 (e.g., audio data 108(1) and/or contextual data 108(2)) was generated. In some examples, the label may be more specific in order to train the machine learning model(s) to locate a mobile device 106 in terms of a specific type of indoor location. For example, the label may indicate whether the mobile devices 106 were located in a building, in a subway, in a parking garage, in a home, in an office, and the like.

At 506, the computing system may train a machine learning model(s) using the historical data 108 (e.g., audio data 108(1) and/or contextual data 108(2)) as training data 114 to obtain the trained machine learning model(s) 116. That is, the labels applied at block 504 may be utilized in supervised learning, as an illustrative example. In some cases, the training at block 506 may use training data 114 that is unlabeled as part of an unsupervised learning approach, or a semi-supervised learning approach. As noted by the off-page reference "A" in FIGS. 4 and 5, the process 400 may continue from block 506 of the process 500, after a machine learning model(s) 116 is trained and usable in the process 400.

Figure 6:
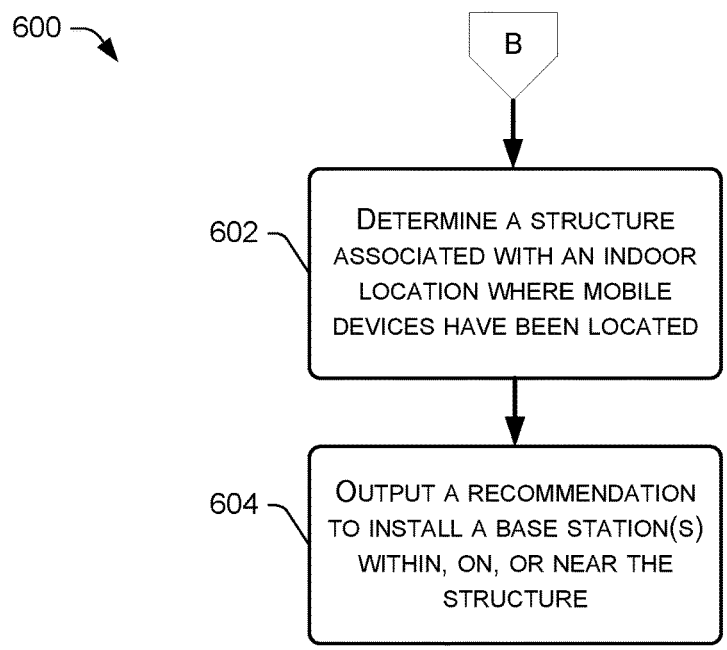
FIG. 6 illustrates a flowchart of an example process for using a machine-learned location(s) of one or more mobile devices for wireless infrastructure planning.

FIG. 6 illustrates a flowchart of an example process 600 for using a machine-learned location(s) of one or more mobile devices 106 for wireless infrastructure planning. For discussion purposes, reference is made to the previous figures in describing the process 600. As noted by the off-page reference "B" in FIGS. 4 and 6, the process 600 may continue from block 410 of the process 400, after a machine-learned location classification(s) 304 has been determined for one or more mobile devices 106.

At 602, a computing system (e.g., the remote system 110, a mobile device 106, etc.) may determine, based at least in part on device-to-location association data that indicates an indoor location where a mobile device(s) 106 was/were located when input data 108 was generated, a structure associated with the indoor location. That is, the process 400 may be used to determine that a mobile device 106 was located inside a building 204 when audio data 108(1) input to the machine learning model(s) 116 was generated. In this case, the structure determined at block 602 may be a specific building. In other examples, the structure determined at block 602 may be a different type of structure, such as a subway, a parking garage, etc.

At 604, the computing system may output a recommendation to install one or more base stations within, on, or near the structure. For example, the computing system may be configured to output a user interface on a display that an employee of the wireless carrier can interpret and use for wireless infrastructure planning. The recommendation output at block 604 may be a recommendation to install a certain number of base stations in a particular building based on the number of mobile devices 106 determined to be located inside the building using the process 400, for example.

Figure 7:
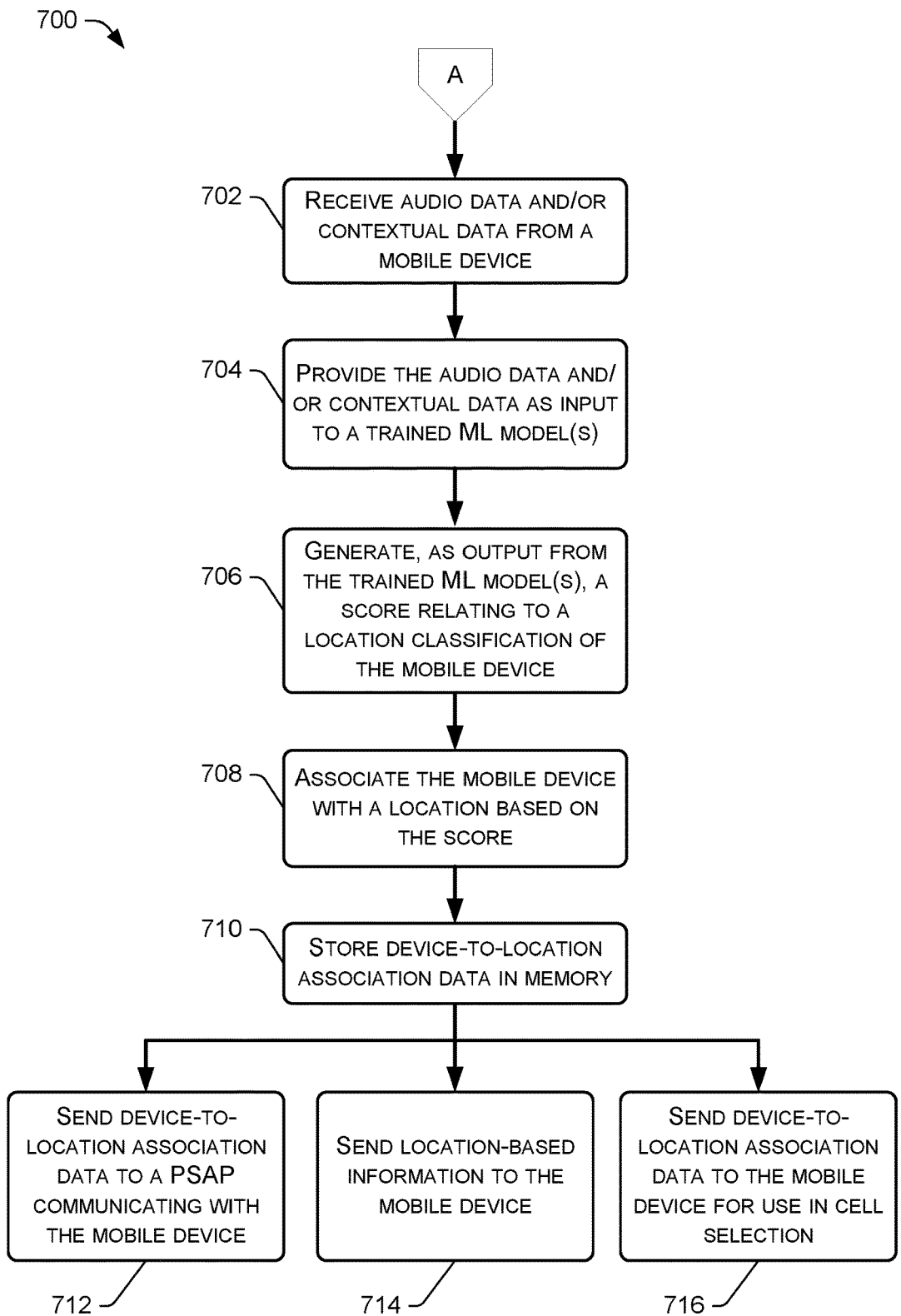
FIG. 7 illustrates a flowchart of an example process for using a machine-learned location of a mobile device in real-time applications.

FIG. 7 illustrates a flowchart of an example process 700 for using a machine-learned location of a mobile device 106 in real-time applications. For discussion purposes, reference is made to the previous figures in describing the process 700. As noted by the off-page reference "A" in FIGS. 5 and 7, the process 700 may continue from block 506 of the process 500, after a machine learning model(s) 116 is trained and usable in the process 700.

At 702, a computing system (e.g., the remote system 110, a mobile device 106, etc.) may receive data 108 (e.g., audio data 108(1) and/or contextual data 108(2)) from the mobile device 106 prior to the providing of the data 108 (e.g., audio data 108(1) and/or contextual data 108(2)) as the input 302 to the trained machine learning model(s) 116. In some examples, the data 108 (e.g., audio data 108(1) and/or contextual data 108(2)) is received at block 702 while the mobile device 106 is involved in a communication session, such as a communication session with a public safety answering point (PSAP).

The operations performed at blocks 704-710 may be similar to the operations performed at blocks 402, 406, 408, and 410 described above with reference to FIG. 4. In other words, at block 710, the device-to-location association data may indicate a location association with the mobile device 106 (e.g., an indoor location, such as a building, a subway, a parking garage, a home, an office, etc.). Blocks 712-716 illustrate various operations that can be performed independently, alternatively, or in combination.

At 712, the computing system may send the device-to-location association data to the PSAP. For example, the device-to-location association data may inform a 911 operator as to a likely location of the mobile device 106, such as indoors, or in a building, in a subway, in a parking garage, a home, an office, etc. This machine-learned location may be provided to the 911 operator notwithstanding a lack of GPS data or an inaccurate GPS location of the mobile device 106 so that emergency responders can narrow down a search for a person(s) in distress.

At 714, the computing system may send location-based information to the mobile device 106 based at least in part on the device-to-location association data. For example, an offer can be provided to the mobile device 106, such as an offer to by a product at a retail location if, say, the device-to-location association data indicates that the mobile device 106 is inside a building where the retail location is located.

At 716, the computing system may send the device-to-location association data to the mobile device 106 for use in cell selection. For example, as described above, the mobile device 106 may determine, based on the device-to-location association data, a frequency band to use for attempting to connecting to a telecommunications network. This may be useful if the mobile device 106 lost a connection (e.g., a call was dropped) and the mobile device 106 is trying to reconnect to the network (e.g., to reestablish the call).

Figure 8:
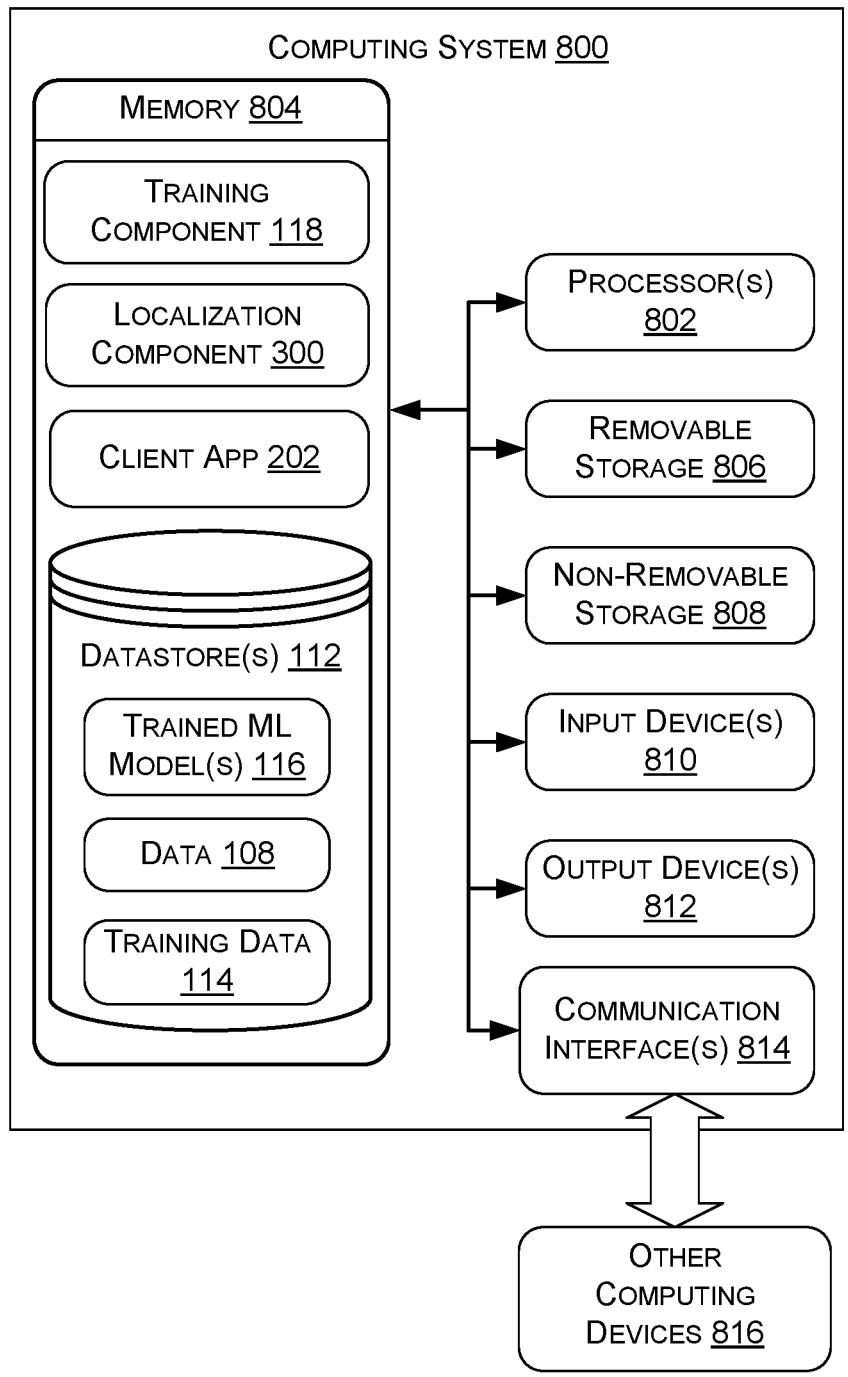
FIG. 8 is a block diagram of an example computing system configured to perform the techniques and processes described herein, in accordance with various embodiments.

FIG. 8 is a block diagram of an example computing system 800 configured to perform the techniques and processes described herein, in accordance with various embodiments. The computing system 800 may the remote system 100 described herein. The computing system 800 may, alternatively, represent a mobile device 106 described herein. As shown in FIG. 8, the computing system 800 may include one or more processors 802 and one or more forms of computer-readable memory 804. The computing system 800 may also include additional storage devices. Such additional storage may include removable storage 806 and/or non-removable storage 808.

In various embodiments, the computer-readable memory 804 comprises non-transitory computer-readable memory 804 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 804 may also be described as computer storage media and may include volatile and nonvolatile, removable and non-removable media implemented in any method or technology for storage of information, such as computer readable instructions, data structures, program modules, or other data. Computer-readable memory 804, removable storage 806 and non-removable storage 808 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the computing system 800. Any such computer-readable storage media may be part of the computing system 800.

The computing system 800 may further include input devices 810 (e.g., a touch screen, keypad, keyboard, mouse, pointer, microphone, etc.) and output devices 812 (e.g., a display, printer, speaker, etc.) communicatively coupled to the processor(s) 802 and the computer-readable memory 804. The computing system 800 may further include a communications interface(s) 814 that allows the computing system 800 to communicate with other computing devices 816 such as via a network(s) (e.g., a telecommunications network, cellular network, IMS network, the Internet, etc.). The communications interface(s) 814 may facilitate transmitting and receiving wired and/or wireless signals over any suitable communications/data technology, standard, or protocol, as described herein. For example, the communications interface(s) 814 can comprise one or more of a cellular radio, a wireless (e.g., IEEE 802.1x-based) interface, a Bluetooth® interface, and so on.

In some embodiments, the computer-readable memory 804 may include, without limitation, the training component 118 configured to train machine learning models 116 based on training data 114, the localization component 300 configured to use the trained machine learning model(s) 116 to output a location classification 304 associated with a mobile device 106 based on data 108 provided as input 302 to the trained machine learning model(s) 116, and, if the computing system 800 represents a mobile device 106, the client application 202 configured to generate and/or collect the data 108, as described herein. FIG. 8 shows that the memory 804 may include the datastore(s) 112 to store the trained machine learning model(s) 116, the data 108, and the training data 114, as described herein. It is to be appreciated that a mobile device 106 may include any one or more, or all, of the components 118, 300, 202 and/or any portion or all of the model(s) 116 and/or data 108, 114. It is also to be appreciated that a remote system 110 may include any one or more, or all, of the components 118, 300 and/or any portion or all of the model(s) 116 and/or data 108, 114. In some implementations, the components 118, 300, 202, model(s) 116, and data 108, 114 is distributed amongst the remote system 110 and a mobile device 106. Accordingly, it is to be appreciated that some or all aspects of the machine learning techniques can be performed by the remote system 110, by the mobile device 106, or by a combination thereof. In at least one example, the mobile device 106 can train and utilize a machine learning model(s) 116 locally, without any assistance from the remote system 110. In other examples, the remote system 110 trains and utilizes the machine learning model(s) 116, or the remote system 110 trains the machine learning model(s) 116 for use by mobile devices 106, such as by downloading the trained machine learning model(s) 116 to a mobile device 106. Utilization of a trained machine learning model(s) 116 by the remote system 110 may include receiving data 108 from a mobile device 106 as real-time input to the trained machine learning model(s) 116 to generate output from the trained machine learning model(s) 116. In other examples, the trained machine learning model(s) 116 may be utilized in a post-processing algorithm, as described herein.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A computer-implemented method comprising:
   accessing, from a datastore, audio data associated with a mobile device, the audio data representing sound in an environment of the mobile device;
   providing the audio data as input to a trained machine learning model;
   generating, as output from the trained machine learning model, a score relating to a probability of the mobile device having been located at a n indoor location at a time when the audio data was generated;
   associating the mobile device with the indoor location based at least in part on the score;
   storing device-to-location association data in memory based at least in part on the associating the mobile device with the indoor location;
   determining, based at least in part on the device-to-location association data, a structure associated with the indoor location; and
   outputting a recommendation to install one or more base stations within, on, or near the structure.

2. The computer-implemented method of claim 1, further comprising:
   providing, as additional input to the trained machine learning model, contextual data associated with the mobile device,
   wherein the score is generated based at least in part on the contextual data.

3. The computer-implemented method of claim 2, wherein the contextual data comprises at least one of:
   call history data relating to one or more phone calls made using the mobile device;
   application usage data relating to one or more mobile applications used by the mobile device;

battery charging data relating to charging of a battery of the mobile device;

device connection data relating to one or more devices to which the mobile device connected via a wired connection or a wireless connection;

settings data relating to one or more settings associated with the mobile device; or sensor data generated by one or more sensors of the mobile device.

4. The computer-implemented method of claim 1, wherein the output from the trained machine learning model specifies the indoor location as at least one of:

a building;
a subway;
a parking garage;
a home; or
an office.

5. The computer-implemented method of claim 1, further comprising:

receiving the audio data from the mobile device prior to the providing of the audio data as the input to the trained machine learning model, wherein the audio data is received while the mobile device is involved in a communication session with a public safety answering point (PSAP); and sending the device-to-location association data to the PSAP.

6. The computer-implemented method of claim 1, further comprising:

receiving the audio data from the mobile device prior to the providing of the audio data as the input to the trained machine learning model; and sending location-based information to the mobile device based at least in part on the device-to-location association data.

7. The computer-implemented method of claim 1, further comprising, prior to the providing of the audio data as the input to the trained machine learning model:

accessing historical audio data associated with mobile devices;

labeling the historical audio data with a label that indicates whether the mobile devices associated with the historical audio data were located indoors at a time when the audio data was generated; and training a machine learning model using the historical audio data as training data to obtain the trained machine learning model.

8. A system comprising:

one or more processors; and memory storing computer-executable instructions that, when executed by the one or more processors, cause performance of operations comprising:

accessing, from a datastore, audio data associated with a mobile device, the audio data representing sound in an environment of the mobile device;

providing the audio data as input to a trained machine learning model;

generating, as output from the trained machine learning model, a score relating to a probability of the mobile device having been located at an indoor location at a time when the audio data was generated;

associating the mobile device with the indoor location based at least in part on the score;

storing device-to-location association data in the memory based at least in part on the associating the mobile device with the indoor location;

determining, based at least in part on the device-to-location association data, a structure associated with the indoor location; and outputting a recommendation to install one or more base stations within, on, or near the structure.

9. The system of claim 8, wherein the operations further comprise:

providing, as additional input to the trained machine learning model, contextual data associated with the mobile device, wherein the contextual data comprises at least one of:

call history data relating to one or more phone calls made using the mobile device;

application usage data relating to one or more mobile applications used by the mobile device;

battery charging data relating to charging of a battery of the mobile device;

device connection data relating to one or more devices to which the mobile device connected via a wired connection or a wireless connection;

settings data relating to one or more settings associated with the mobile device; or sensor data generated by one or more sensors of the mobile device, wherein the score is generated based at least in part on the contextual data.

10. The system of claim 8, wherein the indoor location is one of multiple candidate locations comprising the indoor location and an outdoor location.

11. The system of claim 8, wherein the indoor location is one of multiple candidate locations comprising:

a building;
a subway; and
a parking garage.

12. The system of claim 8, wherein the operations further comprise:

receiving the audio data from the mobile device prior to the providing of the audio data as the input to the trained machine learning model, wherein the audio data is received while the mobile device is involved in a communication session with a public safety answering point (PSAP); and sending the device-to-location association data to the PSAP.

13. The system of claim 8, wherein the audio data:
represents user speech; and
is generated while the mobile device is involved in a communication session.

14. One or more non-transitory computer readable media storing computer-executable instructions that, when executed by one or more processors, cause performance of operations comprising:

accessing, from a datastore, audio data associated with a mobile device, the audio data representing sound in an environment of the mobile device;

providing the audio data as input to a trained machine learning model;

generating, as output from the trained machine learning model, a location classification associated with the mobile device, the location classification indicating that the mobile device was located at an indoor location at a time when the audio data was generated;

associating the mobile device with the indoor location based at least in part on the location classification;

storing device-to-location association data in memory based at least in part on the associating the mobile device with the indoor location;

determining, based at least in part on the device-to-location association data, a structure associated with the indoor location; and outputting a recommendation to install one or more base stations within, on, or near the structure.

15. The one or more non-transitory computer readable media of claim 14, wherein the operations further comprise:

providing, as additional input to the trained machine learning model, contextual data associated with the mobile device, wherein the contextual data comprises at least one of:

call history data relating to one or more phone calls made using the mobile device;

application usage data relating to one or more mobile applications used by the mobile device;

battery charging data relating to charging of a battery of the mobile device;

device connection data relating to one or more devices to which the mobile device connected via a wired connection or a wireless connection;

settings data relating to one or more settings associated with the mobile device; or sensor data generated by one or more sensors of the mobile device, wherein the location classification is generated based at least in part on the contextual data.

16. The one or more non-transitory computer readable media of claim 14, wherein the indoor location is one of multiple candidate locations comprising the indoor location and an outdoor location.

17. The one or more non-transitory computer readable media of claim 14, wherein the operations further comprise:

receiving the audio data from the mobile device prior to the providing of the audio data as the input to the trained machine learning model, wherein the audio data is received while the mobile device is involved in a communication session with a public safety answering point (PSAP); and sending the device-to-location association data to the PSAP.

\* \* \* \* \*